Jan. 24, 1939.  M. GLASER  2,144,841
NUT CRACKING MACHINE
Filed Aug. 10, 1937  2 Sheets-Sheet 1
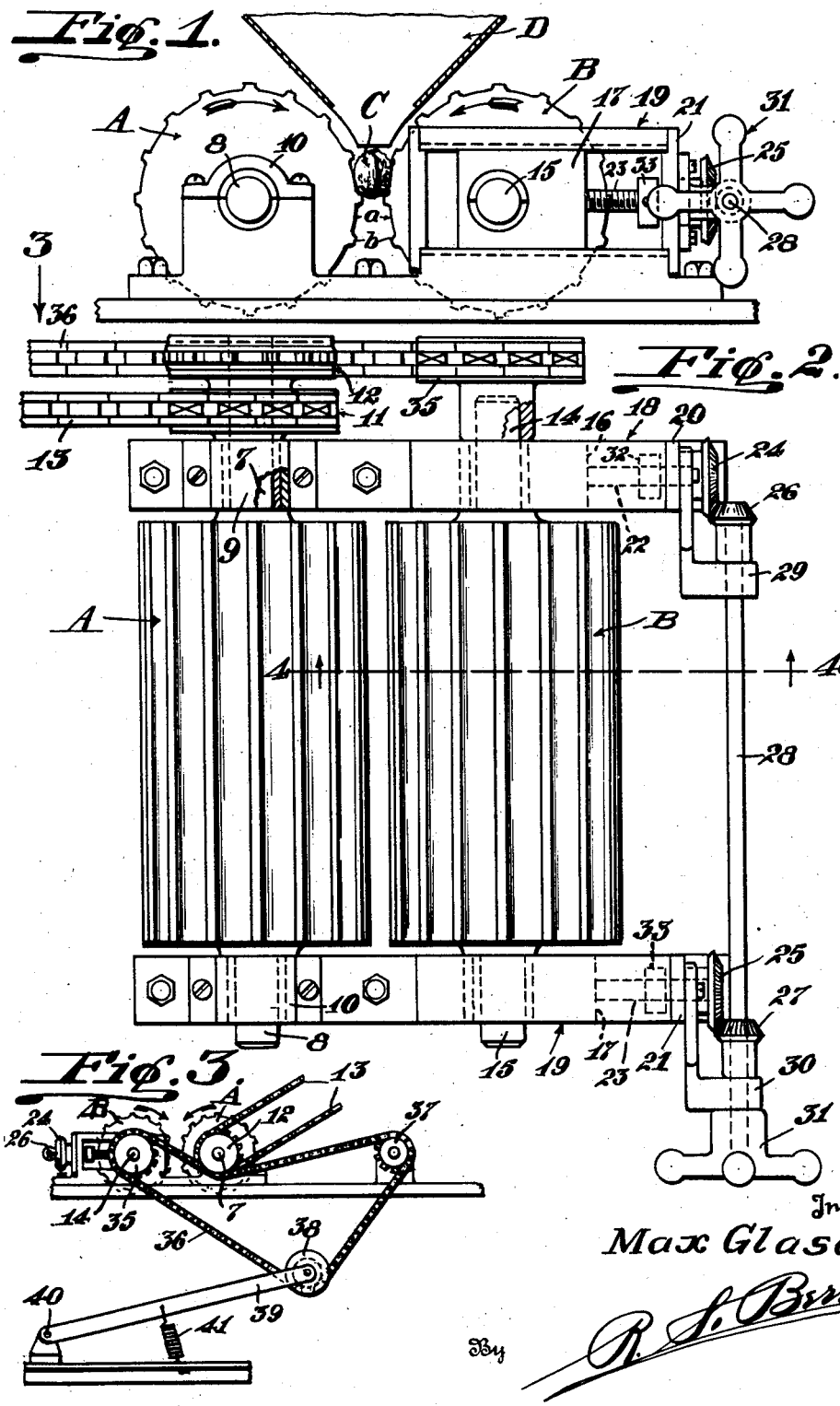
Inventor
Max Glaser;
By R. S. Berry
Attorney Jan. 24, 1939.  M. GLASER  2,144,841

NUT CRACKING MACHINE

Filed Aug. 10, 1937  2 Sheets-Sheet 2

Inventor
Max Glaser;
By R. S. Berry
Attorney

Patented Jan. 24, 1939

2,144,841

UNITED STATES PATENT OFFICE 2,144,841

NUT CRACKING MACHINE

Max Glaser, Hawthorne, Calif.

Application August 10, 1937, Serial No. 158,308

4 Claims. (Cl. 146—11)

This invention relates to a nut cracking mechanism and more particularly pertains to a machine for cracking English walnuts.

An object of the invention is to provide a walnut cracking machine which in operating on a batch of nuts graded to size is capable of cracking the shells in a fashion to preserve a major portion of the kernels of the cracked batch whole and in halves.

Another object is to provide a nut cracking machine in which means are provided for adjusting the cracking mechanism so as to accommodate it to the cracking of nuts of various selected sizes.

Another object is to provide a means for adjusting the cracking mechanism which may be actuated while the machine is in operation so that the operator may observe the effect of any change in the adjustment on a particular batch of nuts being run, to the end of enabling such close adjustment as to produce a minimum of broken half kernels.

Another object is to provide a construction in a nut cracking machine whereby on adjusting the cracking elements for operation on a batch of nuts of nearly uniform graded size, a limited self adjustment may be effected to automatically compensate for nuts of slightly increased diameters or the presentation of the larger dimension of the nuts crosswise of the elements in a manner to avoid excessive crushing of such nuts.

Another object is to provide a nut cracking mechanism embodying a pair of corrugated cracking rollers, in which one of the rollers is mounted for lateral adjustment relative to the other, whereby spacing of the rollers may be varied to permit passage between the rollers of selected nuts of approximately a determined diameter with a minimum of crushing action thereon, and embodying a driving means whereby the adjustment may be made while the rollers are rotating and in action.

A further object is to provide a construction in the cracking rollers such as to insure the feed of nuts therebetween and in a fashion to effect cracking of the shells with a minimum of crushing of the nut kernels.

With the foregoing objects in view, together with such other objects and advantages as may subsequently appear, the invention is carried into effect as illustrated by way of example in the accompanying drawings in which:

Fig. 1 is a view in end elevation of the nut cracking mechanism;

Fig. 2 is a plan view of the mechanism shown in Fig. 1;

Fig. 3 is a diagram depicting the nut cracker mechanism in end elevation as seen in the direction indicated by the arrow 3 in Fig. 2;

Figure 4:
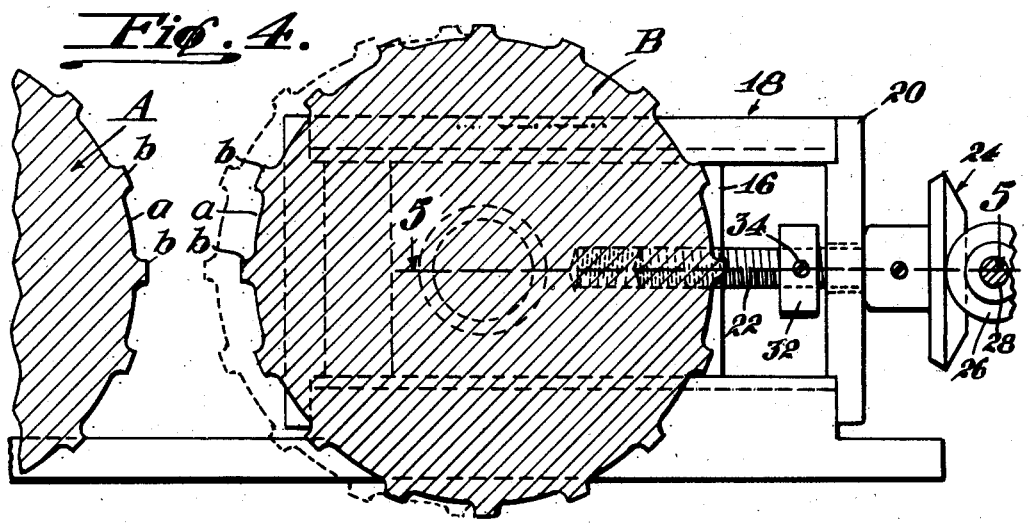
Fig. 4 is an enlarged detail in cross section taken on the line 4—4 of Fig. 2 showing the manner of varying the spacing between a pair of parallel cracking rollers.

Referring to the drawings more specifically A and B indicate a pair of corrugated nut cracking rollers which are mounted in spaced parallel relation to each other with the roller B mounted for adjustment laterally relative to the roller A to vary the space between the rollers.

The roller A is fitted at its ends with trunnions 7 and 8 revolubly supported in bearings 9 and 10 respectively. The trunnion 7 extends through the bearing 9 and is fitted with a pair of sprocket wheels 11 and 12; a sprocket chain 13 engaging the sprocket wheel 11 and leading from any suitable source of power, whereby rotation of the roller A and sprocket wheel 12 may be effected through the trunnion 7 and sprocket 11.

Figure 5:
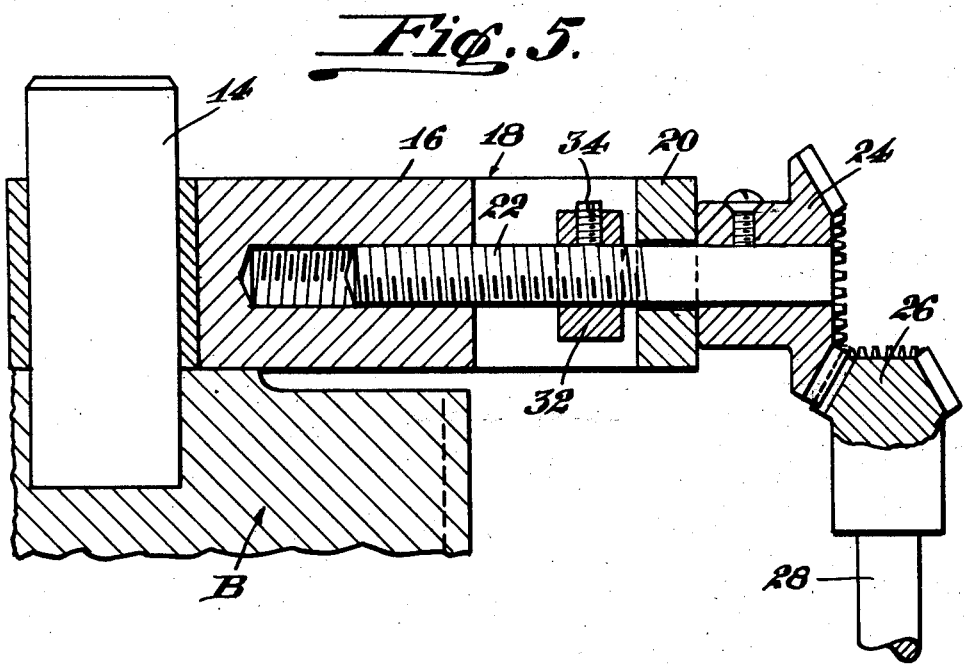
Fig. 5 is an enlarged detail in section taken on the line 5—5 of Fig. 4 showing the adjustable bearing at one end of one of the cracking rollers.

The roller B is fitted with trunnions 14 and 15 which are journaled respectively in slide blocks 16 and 17 mounted for horizontal adjustment in guide ways 18 and 19 which later embody end walls 20 and 21 through which extend threaded horizontal shafts 22 and 23 which are screwed into engagement with the slide blocks as shown in Fig. 5.

The shafts 22 and 23 are fitted at their outer ends with beveled gears 24 and 25 which mesh with pinions 26 and 27 carried on a shaft 28 revolubly supported in bearings 29 and 30 and fitted at its forward end with a hand wheel 31 by which the shaft 28 and pinions 26 and 27 may be manually rotated to effect collective turning of the threaded shafts 22 and 23 through the gears 24 and 25. The shafts 22 and 23 pass loosely through the end walls 20 and 21 to permit longitudinal slideable movement thereof relative thereto. In order to permit slight outward movement of the shafts 22 and 23 the intermeshing teeth of the gears 24—25 and pinions 26—27 are formed of sufficient depth to permit the gears 24 and 25 to advance in the direction of the diameters of the pinions 26 and 27. The extent of the restricted advance thus permitted is materially greater owing to the fact that the intermeshing gears are of a beveled character and, as is to be seen from Fig. 5, relative bodily movement between the intermeshing gears is not at a right angle to the length of the contacting teeth but is in an oblique relation to them.

Means are provided for limiting free longitudinal sliding movement of the shafts 22 and 23 in an outward direction which embodies collars 32 and 33 threaded on the shafts 22 and 23 and fitted with set screws 34 whereby the collars may be fixed on the shafts 22 and 23 in slight spaced relation to the inner faces of the end walls 20 and 21 and whereby the collars will serve as stops in cooperation with the end walls 20 and 21.

The trunnion 14 is fitted with a sprocket wheel 35 around which is passed a sprocket chain 36 one lead of which passes under and engages the sprocket wheel 12 and passes around a direction sprocket 37; the lower lead of the chain 36 extending downwardly from the sprockets 35 and 37 and around a roller 38 on an arm 39 pivoted at 40 to swing vertically, and which arm and roller serve to take up slack in the sprocket chain 36 and to maintain the latter taut. A spring 41 is arranged to exert a downward pull on the arm 39.

The chain 36 serves as a flexible drive between sprocket 12 and the sprocket 35 whereby upon driving the sprocket 11 to revolve the roller A the sprocket 12 will act through the chain 26 and sprocket 35 to revolve the roller B through the trunnion 14.

The rollers A and B are thus geared together to rotate in opposite directions and in operation are revolved inwardly toward each other at their upper portions.

The drag exerted on the portion of the chain passing around the sprocket 35 by driving sprocket 12 together with the pull of the roller 38 and arm 39, serves to maintain the slide blocks 16 and 17 in their normal forwardmost positions, with the hubs of the gears 24 and 25 on the shafts 22 and 23 abutting against the outer faces of the end walls 20 and 21 acting to limit such inward movement of the shafts.

In the operation of the invention, roller B is adjusted to dispose it in proper spaced relation to the roller A by the manipulation of the hand wheel 31 to revolve the shaft 28 and pinions 26 and 27 and thereby drive the beveled gears 24 and 25 to rotate the threaded shafts 22 and 23 and thus cause the shafts to advance or retract the slide blocks 16 and 17 by reason of the threaded engagement of the shafts with the blocks. In this fashion the roller B may be spaced such distance from the roller A that on delivering walnuts of the determined diameters between the rollers the latter on being revolved in opposite directions with their upper portions advancing toward each other as indicated by the arrows in Figs. 1 and 3 will feed and squeeze the nuts between the rollers sufficiently to crack the shells thereof without crushing the kernels with few exceptions.

The corrugations of the rollers A and B are complementary and are formed to provide channels $a$ extending between parallel ribs $b$ with the bottom walls of the channels slightly convex laterally; the channels being of a width to receive nuts between the ribs $b$ in such fashion that crushing action of the shells will be effected by the bottom walls of the channel $a$ rather than by the ribs $b$. The rollers A—B are of like diameter and are correspondingly circumferentially positioned and uniformly rotated so that as they revolve the channels $a$ and ribs $b$ of one roller will be disposed opposite the channels and ribs of the other roller when contiguous thereto, whereby when a nut C is directed between the rollers as from a hopper D it will be deposited on the upper margins of opposed ribs $b$ and thus be disposed in the cracking position between opposed bottom walls of the channels $a$ as shown in Fig. 1.

The manner in which the roller B may be variously spaced relative to the roller A is shown in Fig. 4 wherein the roller B is shown in full lines in one position and in a more advanced position by dotted lines.

It will be observed that by the construction herein set forth the relative spacing of the bottom walls $a$ of opposed channels on the rollers A and B may be nicely adjusted so that the crushing action of the rollers on the nut shells will be just that required to effect cracking of the shells with a minimum of breaking or mutilation of the kernels.

In feeding the nuts between the rollers A and B the nuts are previously graded as to size in a conventional manner so that the nuts fed between the roller will be of substantially corresponding diameters. On initially feeding a charge of nuts between the cracking rollers the operator makes whatever adjustment of the roller B is necessary to effect proper cracking of the nuts; the adjustment being made while the rollers are in operation so that the operator may observe the action of the adjustment on the nuts passing through the machine; the cracked nuts being delivered to a conveyor belt, not shown, in a usual manner.

In event that nuts of slightly larger diameter than the average of the graded nuts are fed between the rollers, or in event nuts should be positioned with their larger diameters spanning the gap between the rollers, an increased thrust will be imposed on the roller B which will act to shift the latter rearwardly a short distance by reason of the loose mounting of the slide blocks 16—17 afforded by the slight range of longitudinal sliding movement permitted the threaded shafts 22 and 23. This rearward movement of the roller B is yieldably opposed by the drag of the sprocket chain 35 on the driving sprocket 35 of the roller B under the combined influence of the sprocket 12 and spring pulled arm 39, and which drag serves on cessation of the rearward thrust on the roller B to restore the latter to its normal advanced position.

While it is impossible to adjust the machine so as to avoid mutilation of the kernels of all of the nuts cracked thereby, by reason of considerable variation in the characteristics of the nuts, it is possible to effect such accuracy of adjustment as to insure the preservation of at least seventy-five per cent of the kernels whole and in halves; it being highly desirable in the cracking of English walnuts to minimize cracking of the kernels into less than halves.

While I have shown and described a specific embodiment of the invention I do not limit myself to the exact details of construction and arrangement shown but may employ such changes and modifications as occasion may require coming within the meaning and scope of the appended claims.

I claim:

1. In a nut cracking machine, a pair of spaced parallel corrugated cracking rollers, means for driving said rollers in opposite directions, a slidable mounting for one of said rollers adapted to permit movement of the roller carried thereby toward and away from the other roller, threaded shafts connected to the said mountings, means for rotating said shafts to advance or retract said mountings, a support thereon said threaded shafts mounted for limited longitudinal reciprocal movement, whereby said slidable mountings may be moved in either direction independent of said shaft rotating means, and adjustable stop members mounted on said shafts and abuttable against said support to limit the movement of the roller provided with aforesaid slidable mountings away from the other roller.

2. In a nut cracking machine, a pair of spaced parallel corrugated cracking rollers, driving means for rotating said rollers, slidable mountings for one of said rollers adapted to permit movement of the roller carried thereby toward and away from the other roller, threaded shafts connected to said mountings, means including pairs of gears for collectively driving said shafts to advance or retract said mountings; said threaded shafts being mounted for slight longitudinal reciprocal movement, the members of said pairs of gears being intermeshed with sufficient looseness to permit said slight movement, adjustable means for limiting longitudinal reciprocal movement of said shafts in a direction to more widely separate said rollers, and means embodied in said driving means yieldably resisting longitudinal movement of said shafts in said direction.

3. In a nut cracking machine, a pair of parallel corrugated cracking rollers, driving means to rotate said rollers, a slidable mounting for one of said rollers allowing such roller to move toward and away from the other roller, a shaft having a screw-threaded engagement with said slidable mounting, guide means whereon said shaft is mounted for slight longitudinal reciprocal movement, means to rotate said shaft to advance or retract said slidable mounting, said shaft rotating means including gearing intermeshing with sufficient looseness to permit said slight movement, there being adjustable stop means carried by said shaft and abuttable against a portion of said guide means to define the extent of said slight movement in the direction which separates more widely the cracking rollers, and means embodied in the first recited driving means yieldably resisting the movement of the slidably mounted roller from its mate.

4. In a nut cracking machine, a pair of parallel corrugated cracking rollers, driving means to rotate said rollers, a slidable mounting for one of said rollers allowing such roller to move toward and away from the other roller, a shaft extending at substantially a right angle to the axes of said rollers and having a screw-threaded engagement with said slidable mounting, guide means whereon said shaft is mounted for slight longitudinal reciprocal movement, a bevel gear secured to said shaft, a driving shaft having a bevel gear secured to it, the latter gear being loosely in mesh with the gear on said longitudinally movable shaft to allow said movable shaft to have a material longitudinal movement while said gears remain in mesh with each other, there being adjustable stop means carried by said longitudinally movable shaft and abuttable against a portion of said guide means to define the extent of said slight movement in the direction which separates more widely the cracking rollers, and means embodied in the first recited driving means yieldably resisting the movement of the slidably mounted roller from its mate.

MAX GLASER.